(12) United States Patent
Kim et al.

(10) Patent No.: US 12,237,860 B2
(45) Date of Patent: Feb. 25, 2025

(54) TRANSCEIVER AND METHOD OF DRIVING THE SAME

(71) Applicant: SAMSUNG DISPLAY CO., LTD., Yongin-si (KR)

(72) Inventors: Hyun Su Kim, Yongin-si (KR); Kyung Youl Min, Yongin-si (KR); Jun Dal Kim, Yongin-si (KR); Jong Man Bae, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 403 days.

(21) Appl. No.: 17/574,018

(22) Filed: Jan. 12, 2022

(65) Prior Publication Data
US 2022/0399915 A1    Dec. 15, 2022

(30) Foreign Application Priority Data
Jun. 14, 2021 (KR) .......................... 10-2021-0077051

(51) Int. Cl.
*H04B 1/40* (2015.01)
*H04B 1/04* (2006.01)
*H04L 5/00* (2006.01)
*H04L 25/02* (2006.01)

(52) U.S. Cl.
CPC ............ *H04B 1/40* (2013.01); *H04B 1/0483* (2013.01); *H04L 5/0044* (2013.01); *H04L 25/0272* (2013.01)

(58) Field of Classification Search
CPC ...... H04B 1/0483; H04B 1/40; H04L 25/0272; H04L 25/49; H04L 5/0044; H04L 5/0053; Y02D 30/70
See application file for complete search history.

(56) References Cited

U.S. PATENT DOCUMENTS

| | | |
|---|---|---|
| 8,611,484 B2 | 12/2013 | Jeon et al. |
| 9,466,263 B2 | 10/2016 | Bae et al. |
| 9,853,806 B2 | 12/2017 | Sengoku |
| 10,313,100 B2 | 6/2019 | Yim |
| 10,657,875 B2 | 5/2020 | Chung et al. |
| 10,726,808 B2 | 7/2020 | Han et al. |
| 10,796,661 B2 | 10/2020 | Park |
| 10,943,559 B2 | 3/2021 | Park |

(Continued)

FOREIGN PATENT DOCUMENTS

| | | |
|---|---|---|
| KR | 1020100092562 A | 8/2010 |
| KR | 101671018 B1 | 10/2016 |
| KR | 1020190052186 A | 5/2019 |

(Continued)

*Primary Examiner* — Nader Bolourchi
(74) *Attorney, Agent, or Firm* — CANTOR COLBURN LLP

(57) ABSTRACT

A transceiver includes a transmitter and a receiver connected to each other through a first line and a second line. The transmitter transmits signals having a first voltage range to the first line and the second line in a first mode, and transmits signals having a second voltage range less than the first voltage range to the first line and the second line in a second mode. When transmitting a first payload to the receiver, the transmitter is sequentially driven in the first mode, the second mode, and the first mode, and the transmitter transmits a clock training pattern and the first payload in the second mode.

20 Claims, 12 Drawing Sheets

(56) References Cited

U.S. PATENT DOCUMENTS

2010/0091921 A1* 4/2010 Den Besten ............ H03L 7/189
  713/300
2021/0118356 A1 4/2021 Lim et al.

FOREIGN PATENT DOCUMENTS

| KR | 1020190055466 A | 5/2019 |
| KR | 102071573 B1 | 3/2020 |
| KR | 1020200024984 A | 3/2020 |
| KR | 1020200041406 A | 4/2020 |

* cited by examiner

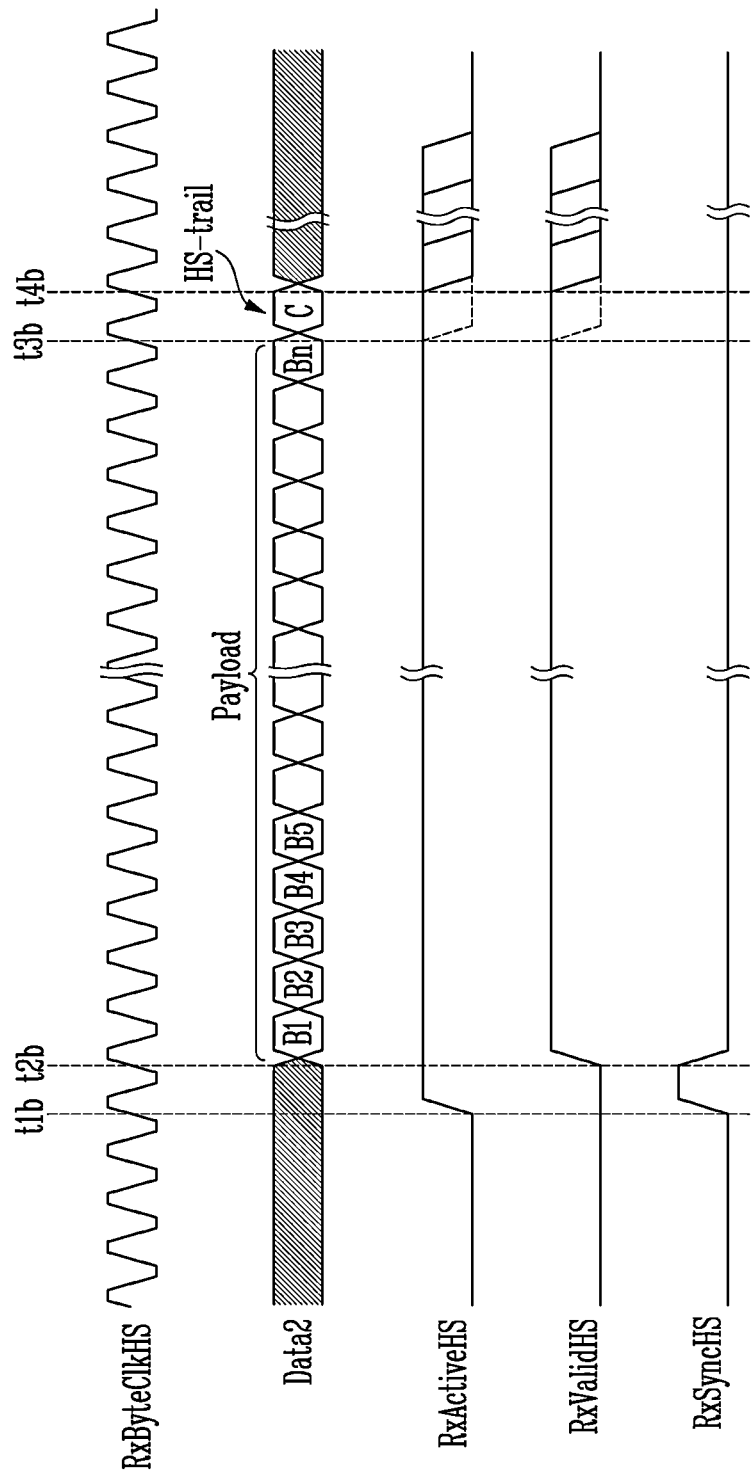

TRANSCEIVER AND METHOD OF DRIVING THE SAME

This application claims priority to Korean Patent Application No. 10-2021-0077051, filed on, Jun. 14, 2021, and all the benefits accruing therefrom under 35 U.S.C. § 119, the content of which in its entirety is herein incorporated by reference.

BACKGROUND

1. Field

The disclosure relates to a transceiver and a method of driving the transceiver.

2. Description of the Related Art

As an information technology is developed, importance of a display device that is a connection medium between a user and information is emphasized. Accordingly, a display device such as a liquid crystal display device and an organic light emitting display device is widely used in various fields.

In general, a display device may perform internal communication using a mobile industry processor interface ("MIPI") protocol. In a display device, a clock line may be separately used when performing internal communication using the MIPI protocol.

SUMMARY

In a display device where the clock line is used when performing internal communication, physical/spatial cost increases and power consumption increases.

Embodiments of the disclosure are to provide a transceiver and a method of driving the transceiver capable of communicating using a mobile industry processor interface ("MIPI") protocol without a clock line.

According to an embodiment of the disclosure, a transceiver includes a transmitter and a receiver connected to each other through a first line and a second line. In such an embodiment, the transmitter transmits signals having a first voltage range to the first line and the second line in a first mode, and transmits signals having a second voltage range less than the first voltage range to the first line and the second line in a second mode. In such an embodiment, when transmitting a first payload to the receiver, the transmitter is sequentially driven in the first mode, the second mode, and the first mode, and the transmitter transmits a clock training pattern and the first payload in the second mode.

In an embodiment, the first line and the second line may be used in a single-ended method in the first mode, and the first line and the second line may be used in a differential method in the second mode.

In an embodiment, the clock training pattern may be a pattern in which one 0 and one 1 are repeated alternately with each other, and the receiver may generate a clock signal using the clock training pattern and the first payload.

In an embodiment, the receiver may decode the first payload to generate a second payload and a dummy pattern, and the dummy pattern may be data in which the same value is repeated.

In an embodiment, when a last value of the second payload is 0, the dummy pattern may be data in which 1 is repeated, and when the last value of the second payload is 1, the dummy pattern may be data in which 0 is repeated.

In an embodiment, the transmitter may further transmit a start pattern between the clock training pattern and the first payload, and the transmitter may further transmit an end pattern after the first payload, in the second mode.

In an embodiment, The receiver may change a logic level of a first control signal from a first level to a second level at a first time point based on an end of reception of the start pattern, the receiver may change a logic level of a second control signal from the first level to the second level at a second time point after the first time point, and the receiver may output first data of the second payload at the second time point.

In an embodiment, the receiver may change a logic level of a third control signal from the first level to the second level at the first time point, and the receiver may change the logic level of the third control signal from the second level to the first level at the second time point.

In an embodiment, the transmitter may encode a third payload to generate data in which the clock training pattern, a start pattern, the first payload, and an end pattern are sequentially positioned, and the third payload may be same data as the second payload.

In an embodiment, the transmitter may transmit data according to a mobile industry processor interface ("MIPI") protocol, the transmitter may sequentially transmit an HS-zero pattern and an HS-sync pattern before transmitting the clock training pattern, and the transmitter may sequentially transmit an HS-trail pattern and an HS-exit pattern after transmitting the end pattern.

According to an embodiment of the disclosure, a method of driving a transceiver including a transmitter and a receiver connected to each other through a first line and a second line includes transmitting, by the transmitter, signals having a first voltage range to the first line and the second line in a first mode, transmitting, by the transmitter, signals having a second voltage range less than the first voltage range to the first line and the second line in a second mode, and transmitting, by the transmitter, the signals having the first voltage range to the first line and the second line in the first mode. In such an embodiment, when transmitting a first payload to the receiver, the transmitter transmits a clock training pattern and the first payload in the second mode.

In an embodiment, the first line and the second line may be used in a single-ended method in the first mode, and the first line and the second line may be used in a differential method in the second mode.

In an embodiment, the clock training pattern may be a pattern in which one 0 and one 1 are repeated alternately with each other, and the receiver may generate a clock signal using the clock training pattern and the first payload.

In an embodiment, the receiver may decode the first payload to generate a second payload and a dummy pattern, and the dummy pattern may be data in which a same value is repeated.

In an embodiment, when a last value of the second payload is 0, the dummy pattern may be data in which 1 is repeated, and when the last value of the second payload is 1, the dummy pattern may be data in which 0 is repeated.

In an embodiment, the transmitter may further transmit a start pattern between the clock training pattern and the first payload, and the transmitter may further transmit an end pattern after the first payload, in the second mode.

In an embodiment, The receiver may change a logic level of a first control signal from a first level to a second level at a first time point based on an end of reception of the start pattern, the receiver may change a logic level of a second control signal from the first level to the second level at a second time point after the first time point, and the receiver may output first data of the second payload at the second time point.

In an embodiment, the receiver may change a logic level of a third control signal from the first level to the second level at the first time point, and the receiver may change the logic level of the third control signal from the second level to the first level at the second time point.

In an embodiment, the transmitter may encode a third payload to generate data in which the clock training pattern, a start pattern, the first payload, and an end pattern are sequentially positioned, and the third payload may be same data as the second payload.

In an embodiment, the transmitter may transmit data according to an MIPI protocol, the transmitter may sequentially transmit an HS-zero pattern and an HS-sync pattern before transmitting the clock training pattern, and the transmitter may sequentially transmit an HS-trail pattern and an HS-exit pattern after transmitting the end pattern.

In such embodiments, the transceiver and the method of driving the transceiver may communicate using the MIPI protocol without a clock line.

BRIEF DESCRIPTION OF THE DRAWINGS

The above and other features of the disclosure will become more apparent by describing in further detail embodiments thereof with reference to the accompanying drawings, in which:

FIG. 5 is a diagram illustrating an operation of a receiver according to an embodiment of the disclosure;

DETAILED DESCRIPTION

Figure 1:
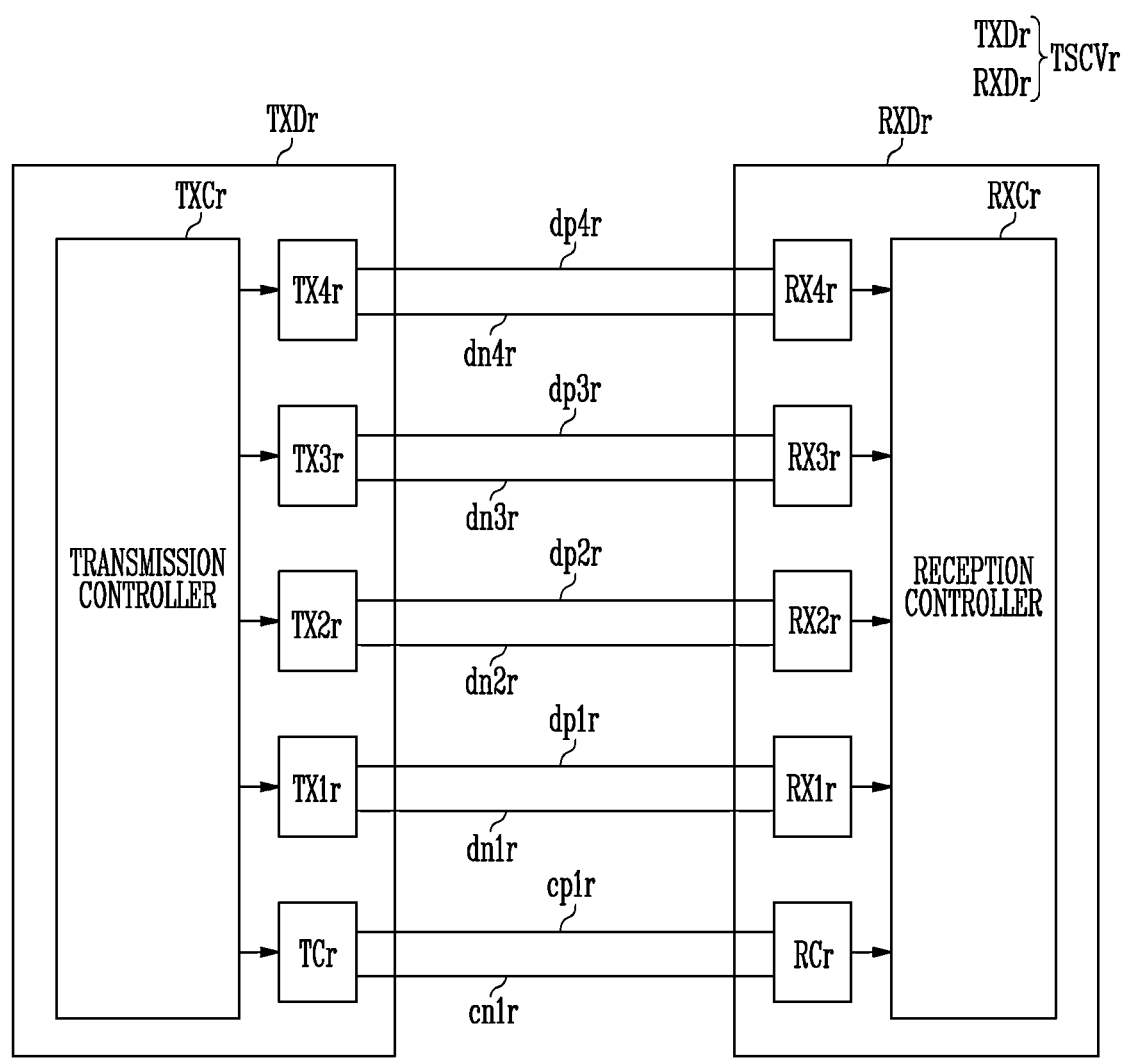
FIGS. 1 and 2 are diagrams illustrating a transceiver according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In order to clearly describe the disclosure, parts that are not related to the description are omitted, and the same or similar components are denoted by the same reference numerals throughout the specification. Therefore, the above-described reference numerals may be used in other drawings.

In addition, sizes and thicknesses of each component shown in the drawings are arbitrarily shown for convenience of description, and thus the disclosure is not necessarily limited to those shown in the drawings. In the drawings, thicknesses may be exaggerated to clearly express various layers and areas.

In addition, an expression "is the same" in the description may mean "is substantially the same". That is, the expression "is the same" may be the same enough for those of ordinary skill to understand that it is the same. Other expressions may also be expressions in which "substantially" is omitted.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a," "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Hereinafter, embodiments of the disclosure will be described in detail with reference to the accompanying drawings.

Figure 2:
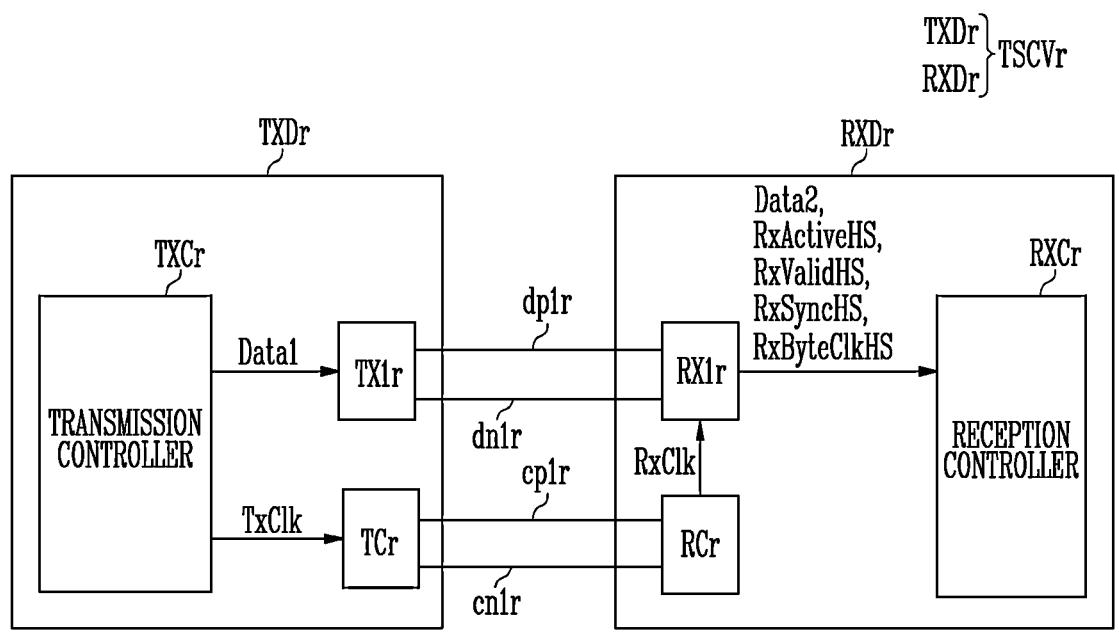

FIGS. 1 and 2 are diagrams illustrating a transceiver according to an embodiment of the disclosure.

Referring to FIG. 1, an embodiment of the transceiver TSCVr may include a transmitter TXDr and a receiver RXDr.

The transmitter TXDr may include a transmission controller TXCr, a plurality of data transmission units TX1r, TX2r, TX3r, and TX4r, and a clock transmission unit TCr. The receiver RXDr may include a reception controller RXCr, a plurality of data reception units RX1r, RX2r, RX3r, and RX4r, and a clock reception unit RCr.

The first data transmission unit TX1r may be connected to the first data reception unit RX1r through a first line dp1r and a second line dn1r. The first data transmission unit TX1r and the first data reception unit RX1r may be referred to as a first data channel. The second data transmission unit TX2r may be connected to the second data reception unit RX2r through a first line dp2r and a second line dn2r. The second data transmission unit TX2r and the second data reception unit RX2r may be referred to as a second data channel. The third data transmission unit TX3r may be connected to the third data reception unit RX3r through a first line dp3r and a second line dn3r. The third data transmission unit TX3r and the third data reception unit RX3r may be referred to as a third data channel. The fourth data transmission unit TX4r may be connected to the fourth data reception unit RX4r through a first line dp4r and a second line dn4r. The fourth data transmission unit TX4r and the fourth data reception unit RX4r may be referred to as a fourth data channel. The clock transmission unit TCr may be connected to the clock reception unit RCr through a first clock line cp1r and a second clock line cn1r. The clock transmission unit TCr and the clock reception unit RCr may be referred to as a clock channel.

The plurality of data transmission units TX1r, TX2r, TX3r, and TX4r, the clock transmission unit TCr, the plurality of data reception units RX1r, RX2r, RX3r, and RX4r, and the clock reception unit RCr may correspond to a physical layer and a data link layer of an OSI 7 layer model, may correspond to a network interface of a TCP/IP protocol, or may correspond to a physical layer of a mobile industry processor interface ("MIPI") protocol. The physical layer of the MIPI protocol may be configured according to various predetermined specifications, such as D-PHY, C-PHY, and M-PHY. Hereinafter, for ease of description, an embodiment where the plurality of data transmission units TX1r, TX2r, TX3r, and TX4r, the clock transmission unit TCr, the plurality of data reception units RX1r, RX2r, RX3r, and RX4r, and the clock reception unit RCr are configured according to the D-PHY specification among the physical layers of the MIPI protocol will be described in detail, but not being limited thereto.

The transmission controller TXCr and the reception controller RXCr may correspond to a network layer and a transport layer of the OSI 7 layer model, or may correspond to the Internet and transport of the TCP/IP protocol, or may correspond to a protocol layer of the MIPI protocol. The protocol layer of the MIPI protocol may be configured according to various predefined specifications such as a display serial interface ("DSI") and a camera serial interface ("CSI)". Hereinafter, embodiments where the transmission controller TXCr and the reception controller RXCr are configured according to the DSI specification among the protocol layers of the MIPI protocol will be described in detail.

In an embodiment, the transmission controller TXCr, the plurality of data transmission units TX1r, TX2r, TX3r, and TX4r, and the clock transmission unit TCr may be configured separately from each other in hardware, and may have a configuration in which at least two or more thereof are integrated in hardware. In an embodiment, the transmission controller TXCr, the plurality of data transmission units TX1r, TX2r, TX3r, and TX4r, and the clock transmission unit TCr may be configured separately from each other in software, and may have a configuration in which at least two or more thereof are integrated in software. in an embodiment, the transmitter TXDr may be configured as a part (hardware or software) of another controller (for example, an application processor ("AP"), a graphics processing unit ("GPU"), a central processing unit ("CPU"), or the like), or may be configured as independent hardware (for example, a transmission dedicated integrated circuit ("IC")).

In an embodiment, the reception controller RXCr, the plurality of data reception units RX1r, RX2r, RX3r, and RX4r, and the clock reception unit RCr may be configured separately from each other in hardware, and may have a configuration in which at least two or more thereof are integrated in hardware. In an embodiment, the reception controller RXCr, the plurality of data reception units RX1r, RX2r, RX3r, and RX4r, and the clock reception unit RCr may be configured separately from each other in software, and may have a configuration in which at least two or more thereof are integrated in software. In an embodiment, the receiver RXDr may be configured as a part (hardware or software) of another controller (for example, a timing controller ("TCON"), a TCON embedded driver IC ("TED"), a driver IC ("D-IC"), or the like), or may be configured as independent hardware (for example, a reception dedicated IC).

In an embodiment, as shown in FIG. 1, the transceiver TSCVr may include four data channels, and the four data channels may transmit and receive data independent of each other. The four data channels may share one clock channel.

Referring to FIG. 2, an embodiment of the transceiver TSCVr including a minimum number of one data channel is shown. In one embodiment, for example, the transmitter TXDr may include one first data transmission unit TX1r, and the receiver RXDr may include one first data reception unit RX1r.

The transmission controller TXCr may provide first data Data1 to the first data transmission unit TX1r and provide a transmission clock signal TxClk to the clock transmission unit TCr.

The first data transmission unit TX1r may transmit the first data Data1 through the first line dp1r and the second line dn1r. When the first data DATA1 is transmitted, the first data transmission unit TX1r may transmit other data by adding the other data before and after (prior to and subsequent to) the first data Data1 according to a predetermined protocol.

The clock transmission unit TCr may transmit the transmission clock signal TxClk through the first clock line cp1r and the second clock line cn1r.

The clock reception unit RCr may provide a reception clock signal RxClk received through the first clock line cp1r and the second clock line cn1r to the first data reception unit RX1r.

The first data reception unit RX1r may sample the data received through the first line dp1r and the second line dn1r based on the received clock signal RxClk. The first data reception unit RX1r may provide second data Data2 including a same payload as the first data Data1 to the reception controller RXCr. In an embodiment, the first data reception unit RX1r may provide a plurality of control signals RxActiveHS, RxValidHS, RxSyncHS, and RxByteClkHS to be used according to a protocol to the reception controller RXCr.

Figure 3:
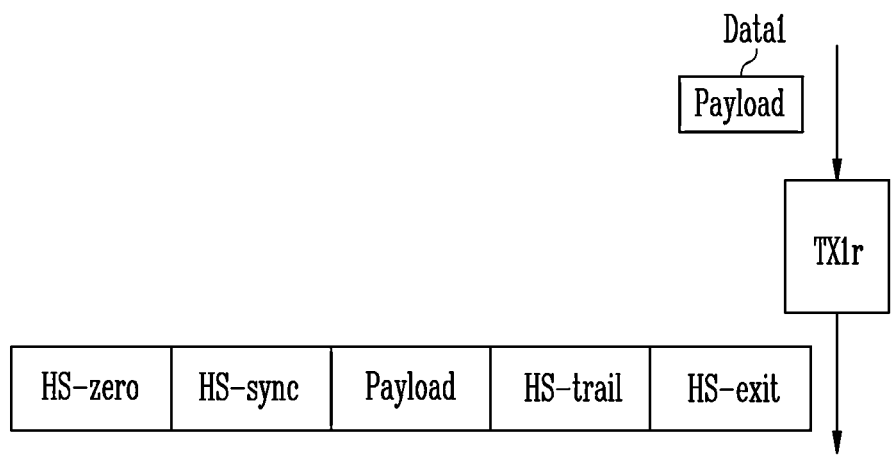
FIGS. 3 and 4 are diagrams illustrating an operation of a transmitter according to an embodiment of the disclosure.
Figure 4:
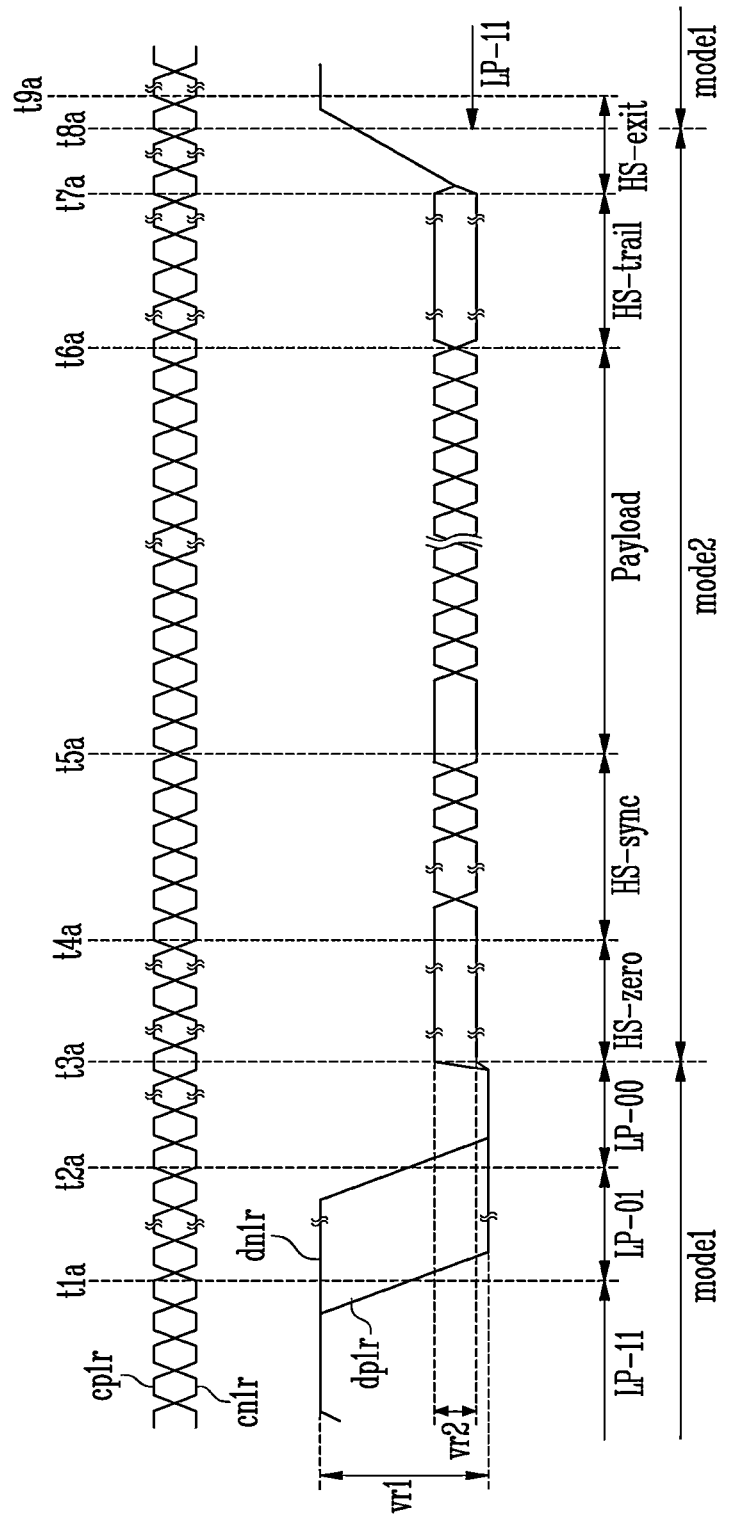

FIGS. 3 and 4 are diagrams illustrating an operation of a transmitter according to an embodiment of the disclosure.

Referring to FIG. 3, the first data transmission unit TX1r may receive the first data Data1 including a payload Payload. The first data transmission unit TX1r may transmit other data by adding the other data before and after (prior to and subsequent to) the payload Payload according to a predetermined protocol. In one embodiment, for example, where the predetermined protocol is the MIPI protocol, the first data transmission unit TX1r may sequentially transmit a pattern HS-zero, a pattern HS-sync, the payload Payload, a pattern HS-trail, and a pattern HS-exit.

Referring to FIG. 4, the transmitter TXDr (in particular, the first data transmission unit TX1r) may transmit signals having a first voltage range vr1 to the first line dp1r and the second line dn1r in a first mode mode1. In such an embodiment, the transmitter TXDr may transmit signals having a second voltage range vr2 less than the first voltage range vr1 to the first line dp1r and the second line dn1r in a second mode mode2.

In one embodiment, for example, an upper limit of the first voltage range vr1 may be greater than an upper limit of the second voltage range vr2, and a lower limit of the first voltage range vr1 may be less than a lower limit of the second voltage range vr2. In such an embodiment where the MIPI protocol is applied to the transceiver TSCVr, the first mode mode1 may be a low power ("LP") mode, and the second mode mode2 may be a high speed ("HS") mode.

In an embodiment, in the first mode mode1, the first line dp1r and the second line dn1r may be used in a single-ended method. That is, the signals transmitted to each of the first line dp1r and the second line dn1r in the first mode mode1 may be the same as or different from each other. In such an embodiment, in the second mode mode2, the first line dp1r and the second line dn1r may be used in a differential method. That is, the signals transmitted to each of the first line dp1r and the second line dn1r in the second mode mode2 are different from each other. The first line dp1r may be a positive line, and the second line dn1r may be a negative line.

In transmitting the payload Payload to the receiver RXDr, the transmitter TXDr may be sequentially driven in the first mode mode1, the second mode mode2, and the first mode mode1.

In order to inform switching from the first mode mode1 to the second mode mode2, the transmitter TXDr may transmit predefined patterns (for example, a pattern LP-11, a pattern LP-01, and a pattern LP-00) to the first line dp1r and the second line dn1r.

In one embodiment, for example, the transmitter TXDr may maintain the signals applied to the first line dp1r and the second line dn1r as a logic high level before a time point t1a (LP-11 pattern). When a voltage level of the signal is greater than a first predefined threshold voltage level, the voltage level of the signal may be determined as a logic high level, and when the voltage level of the signal is less than a predefined second threshold voltage level, the voltage level of the signal may be determined as a logic low level. Next, the transmitter TXDr may change the signal of the first line dp1r to the logic low level at the time point t1a and maintain the signal of the second line dn1r as the logic high level (that is, the pattern LP-01). Next, at a time t2a, the transmitter TXDr may maintain the signal of the first line dp1r as the logic low level and change the signal of the second line dn1r to the logic low level (that is, the pattern LP-00).

Next, in the second mode mode2, the transmitter TXDr may sequentially transmit the pattern HS-zero, the pattern HS-sync, the payload Payload, the pattern HS-trail, and the pattern HS-exit described above. In one embodiment, for example, the transmitter TXDr may transmit the pattern HS-zero during a period t3a to t4a, transmit the pattern HS-sync during a period t4a to t5a, transmit the payload Payload during a period t5a to t6a, transmit the pattern HS-trail during a period t6a to t7a, and transmit the pattern HS-exit after a time point t7a.

The pattern HS-zero may be a pattern for informing a waiting period after entering from the first mode mode1 to the second mode mode2. In one embodiment, for example, the pattern HS-zero may be a pattern in which 0 is repeated.

The pattern HS-sync may be a pattern informing a transmission start of the payload Payload. In one embodiment, for example, the pattern HS-sync may have OxB8h value or 00011101 value.

The payload Payload may be effective data to be transmitted. Therefore, the payload Payload may include variable values other than a predetermined pattern.

The pattern HS-trail may be a pattern informing a transmission end of the payload Payload. The pattern HS-trail may be a pattern in which a value opposite to last data of the payload Payload is repeated. In one embodiment, for example, when the last data (bit) of the payload Payload is 0, the pattern HS-trail may be a pattern in which 1 is repeated. In one embodiment, for example, when the last data (bit) of the payload Payload is 1, the pattern HS-trail may be a pattern in which 0 is repeated.

The pattern HS-exit may be a pattern informing that the second mode mode2 is ended and the first mode mode1 is started. The pattern HS-exit may not be configured of a specific bit, but may be a transitional pattern in which a voltage is increased to exceed the second voltage range vr2.

The transmitter TXDr may change the signals applied to the first line dp1r and the second line dn1r to the logic high level from a time point t8a (that is, the pattern LP-11). Accordingly, the transmitter TXDr may inform that the second mode mode2 is ended and the first mode mode1 is started.

The transmitter TXDr (in particular, the clock transmission unit TCr) may transmit the transmission clock signal TxClk in a differential mode through the first clock line cp1r and the second clock line cn1r in the sequential first mode mode1, second mode mode2, and first mode mode1. The first data reception unit RX1r may sample data received in the second mode mode2 based on the received clock signal RxClk (refer to FIG. 2).

FIG. 5 is a diagram illustrating an operation of a receiver according to an embodiment of the disclosure.

In an embodiment, the second data Data2 and the plurality of control signals RxActiveHS, RxValidHS, RxSyncHS, and RxByteClkHS may be generated by the receiver RXDr (in particular, the first data reception unit RX1r) as shown in FIG. 5.

The control signal RxByteClkHS may be a clock signal for informing a data transmission unit of a byte unit. In one embodiment, for example, the control signal RxByteClkHS may indicate that one byte of the second data Data2 is transmitted for each one cycle of the control signal RxByte- ClkHS. In an embodiment, the control signal RxByteClkHS may be a clock signal used for data processing in the reception controller RXC. In one embodiment, for example, the control signal RxByteClkHS may be the entire system clock for data processing after a deserializer.

The second data Data2 may include additional information C and the payload Payload configured of or defined by byte units B1, B2, B3, B4, B5, . . . , and Bn. In one embodiment, for example, the additional information C may be information corresponding to the pattern HS-trail from a time point t3b to a time point t4b. In one embodiment, for example, the additional information C may be 8 bit information in which 0 is repeated or 1 is repeated. In one embodiment, for example, the first data reception unit RX1r may transmit the second data Data2 obtained by parallelizing the sampled payload Payload and the pattern HS-trail through the deserializer (for example, parallelizing to 8 lines) to the reception controller RXCr.

At a time point t1b, a logic level of the first control signal RxActiveHS may be changed from a first level (for example, the logic low level) to a second level (for example, the logic high level). The time point t1b may correspond to one cycle before the control signal RxByteClkHS from a time point t2b at which transmission of the second data Data2 is started. The first data reception unit RX1r may determine the time point t1b, based on the time point t5a at which the pattern HS-sync is ended.

At a time point t2b, a logic level of the second control signal RxValidHS may be changed from the first level to the second level. The time point t2b may be a time point at which first data B1 of the payload Payload of the second data Data2 is output. The time point t2b may be one period after the control signal RxByteClkHS from the time point t1b.

At the time point t1b, a logic level of the third control signal RxSyncHS may be changed from the first level to the second level, and at the time point t2b, the logic level may be changed from the second level to the first level.

Figure 6A:
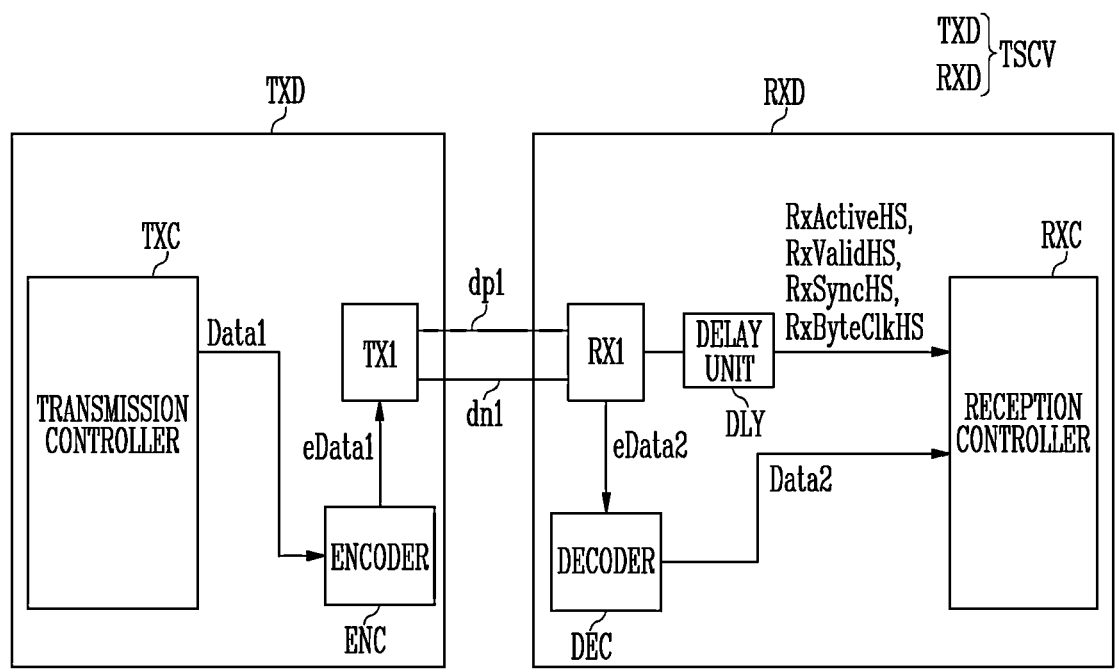
FIGS. 6A and 6B are diagrams illustrating a transceiver according to an alternative embodiment of the disclosure.
Figure 6B:
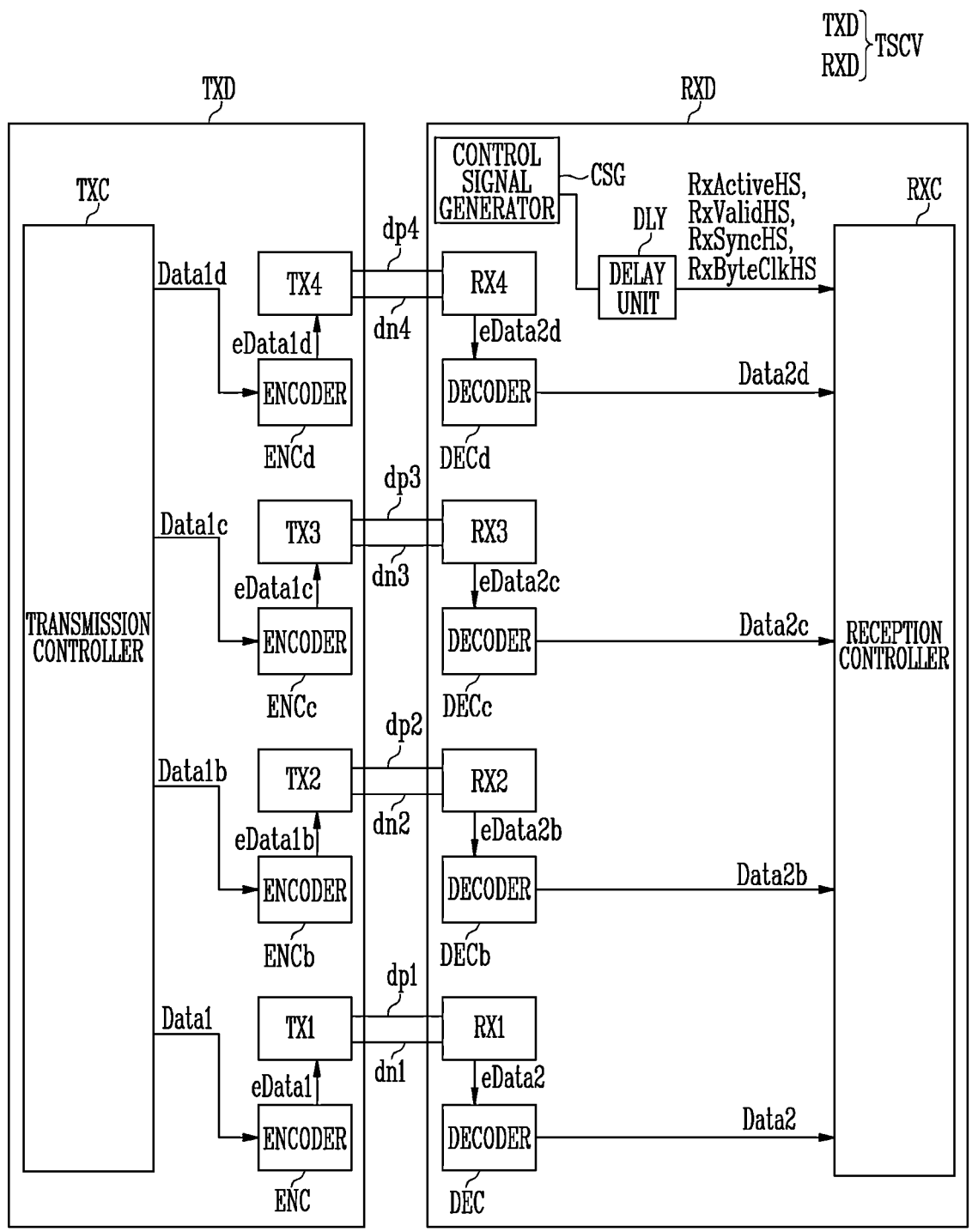

FIGS. 6A and 6B are diagrams illustrating a transceiver according to an alternative embodiment of the disclosure.

The transceiver TSCV of FIG. 6A is substantially the same as the transceiver TSCVr of FIG. 2 except that the clock transmission unit TCr, the clock reception unit RCr, and the clock lines cp1r and cn1r are removed, and an encoder ENC, a decoder DEC, and a delay unit DLY are added. Hereinafter, different elements between the transceiver TSCV of FIG. 6A and the transceiver TSCVr of FIG. 2 are mainly described, and any repetitive detailed descriptions of the same or like elements as those of FIG. 2 will be omitted or simplified.

In an embodiment, as shown in FIGS. 6A and 6B, a transmitter TXD may include a transmission controller TXC, a first data transmission unit TX1, and the encoder ENC. In such an embodiment, a receiver RXD may include a reception controller RXC, a first data reception unit RX1, and the decoder DEC.

The first data transmission unit TX1 may be connected to the first data reception unit RX1 through a first line dp1 and a second line dn1. The first data transmission unit TX1 and the first data reception unit RX1 may be referred to as a first data channel. The first data transmission unit TX1 and the first data reception unit RX1 may correspond to the physical layer and the data link layer of the OSI 7 layer model, may correspond to the network interface of the TCP/IP protocol, or may correspond to the physical layer of the MIPI protocol. The physical layer of the MIPI protocol may be configured according to various predetermined specifications, such as D-PHY, C-PHY, and M-PHY. Hereinafter, for ease of description, an embodiment where the first data transmission unit TX1 and the first data reception unit RX1 are configured according to the D-PHY specification among the physical layers of the MIPI protocol will be described in detail, but not being limited thereto.

In an embodiment, the transmission controller TXC and the reception controller RXC may correspond to the network layer and the transport layer of the OSI 7 layer model, or may correspond to the Internet and transport of the TCP/IP protocol, or may correspond to a protocol layer of the MIPI protocol. The protocol layer of the MIPI protocol may be configured according to various predefined specifications such as the DSI and the CSI. Hereinafter, for ease of description, an embodiment where the transmission controller TXC and the reception controller RXC are configured according to the DSI specification among the protocol layers of the MIPI protocol will be described in detail, but not being limited thereto.

In an embodiment, the transmission controller TXC, the first data transmission unit TX1, and the encoder ENC may be configured separately from each other in hardware, or may have a configuration in which two or more thereof are integrated in hardware. In an embodiment, the transmission controller TXC, the first data transmission unit TX1, and the encoder ENC may be configured separately from each other in software, or may have a configuration in which two or more are integrated in software. In an embodiment, the transmitter TXD may be configured as a part (hardware or software) of another controller (for example, an AP, a GPU, a CPU, or the like), or may be configured as independent hardware (for example, a transmission dedicated IC).

In an embodiment, the reception controller RXC, the first data reception unit RX1, the decoder DEC, and the delay unit DLY may be separately from each other in hardware, or may have a configuration in which two or more are integrated in hardware. In an embodiment, the reception controller RXC, the first data reception unit RX1, the decoder DEC, and the delay unit DLY may be configured separately from each other in software, or may have a configuration in which two or more are integrated in software. In an embodiment, the receiver RXD may be configured as a part (hardware or software) of another controller (for example, a TCON, a TED, a D-IC, or the like), or may be configured as independent hardware (for example, a reception dedicated IC).

The transmission controller TXC may provide the first data Data1 including a third payload (that is, an original payload) to the encoder ENC. The encoder ENC may encode the first data Data1 to generate first encoded data eData1 including a first payload (that is, an encoded payload), and provide the first encoded data eData1 to the first data transmission unit TX1. The first data transmission unit TX1 may transmit other data by adding the other data before and after (prior to and subsequent to) the first encoded data eData1 according to a predetermined protocol.

The first data reception unit RX1 may generate a clock signal using the first encoded data eData1 and sample the data received through the first line dp1 and the second line dn1 based on the generated clock signal. In one embodiment, for example, the first data reception unit RX1 may include a clock data recovery circuit. The first data reception unit RX1 may provide second encoded data eData2 including the same first payload as the first encoded data eData1 to the decoder DEC. The decoder DEC may decode the second encoded data eData2 to generate the second data Data2 including the same payload as the first data Data1, and provide the second data Data2 to the reception controller RXC.

In an embodiment, the first data reception unit RX1 may generate the plurality of control signals RxActiveHS, RxValidHS, RxSyncHS, and RxByteClkHS to be used according to a protocol. When the plurality of control signals RxActiveHS, RxValidHS, RxSyncHS, and RxByteClkHS is generated, the delay unit DLY may delay the plurality of control signals RxActiveHS, RxValidHS, RxSyncHS, and RxByteClkHS by a decoding time and provide the plurality of control signals RxActiveHS, RxValidHS, RxSyncHS, and RxByteClkHS to the reception controller RXC. Here, the decoding time may be a time used for the decoder DEC to decode the second encoded data eData2 to generate the second data Data2.

In an embodiment, as shown in FIG. 6A, the transceiver TSCV may be configured with a single data channel, but not being limited thereto. Alternatively, the transceiver TSCV may be configured with a plurality of data channels (for example, four data channels) as shown in FIG. 6B.

Referring to FIG. 6B, in an embodiment, the transmitter TXD may further include second to fourth data transmission units TX2, TX3, and TX4 and corresponding encoders ENCb, ENCc, and ENCd. In such an embodiment, the receiver RXD may further include second to fourth data reception units RX2, RX3, and RX4 and corresponding decoders DECb, DECc, and DECd. In such an embodiment, the receiver RXD may include a control signal generator CSG and the delay unit DLY.

The second data transmission unit TX2 may be connected to the second data reception unit RX2 through a first line dp2 and a second line dn2. The second data transmission unit TX2 and the second data reception unit RX2 may be referred to as a second data channel. The third data transmission unit TX3 may be connected to the third data reception unit RX3 through a first line dp3 and a second line dn3. The third data transmission unit TX3 and the third data reception unit RX3 may be referred to as a third data channel. The fourth data transmission unit TX4 may be connected to the fourth data reception unit RX4 through a first line dp4 and a second line dn4. The fourth data transmission unit TX4 and the fourth data reception unit RX4 may be referred to as a fourth data channel. The plurality of data channels may transmit and receive data independent of each other.

Since an operation of the encoders ENCb, ENCc, and ENCd encoding data Data1b, Data1c, and Data1d to generate encoded data eData1b, eData1c, and eData1d is substantially the same as an operation of the encoder ENC described above with reference to FIG. 6A, any repetitive detailed description thereof will be omitted.

Since an operation of the decoders DECb, DECc, and DECd decoding encoded data eData2b, eData2c, and eData2d to generate data Data2b, Data2c, and Data2d is substantially the same as an operation of the decoder DEC described above with reference to FIG. 6A, any repetitive detailed description thereof will be omitted.

The control signal generator CSG may generate the control signals RxActiveHS, RxValidHS, RxSyncHS, and RxByteClkHS using data received by the second to fourth data reception units RX2, RX3, and RX4. In one embodiment, for example, the control signal generator CSG may align a timing of the data received by the second to fourth data reception units RX2, RX3, and RX4, and generate the control signals RxActiveHS, RxValidHS, RxSyncHS, and RxByteClkHS based on the aligned data.

The delay unit DLY may delay the plurality of control signals RxActiveHS, RxValidHS, RxSyncHS, and RxByteClkHS by a decoding time and provide the plurality of control signals RxActiveHS, RxValidHS, RxSyncHS, and RxByteClkHS to the reception controller RXC. Here, the decoding time may be a time used for the decoders DEC, DECb, DECc, and DECd to decode the second encoded data eData2, eData2b, eData2c, and eData2d to generate the second data Data2, Data2b, Data2c, and Data2d. In one embodiment, for example, when the decoding times of the decoders DEC, DECb, DECc, and DECd are different from each other, the delay unit DLY may delay the plurality of control signals RxActiveHS, RxValidHS, RxSyncHS, and RxByteClkHS based on the slowest decoding time.

Figure 7:
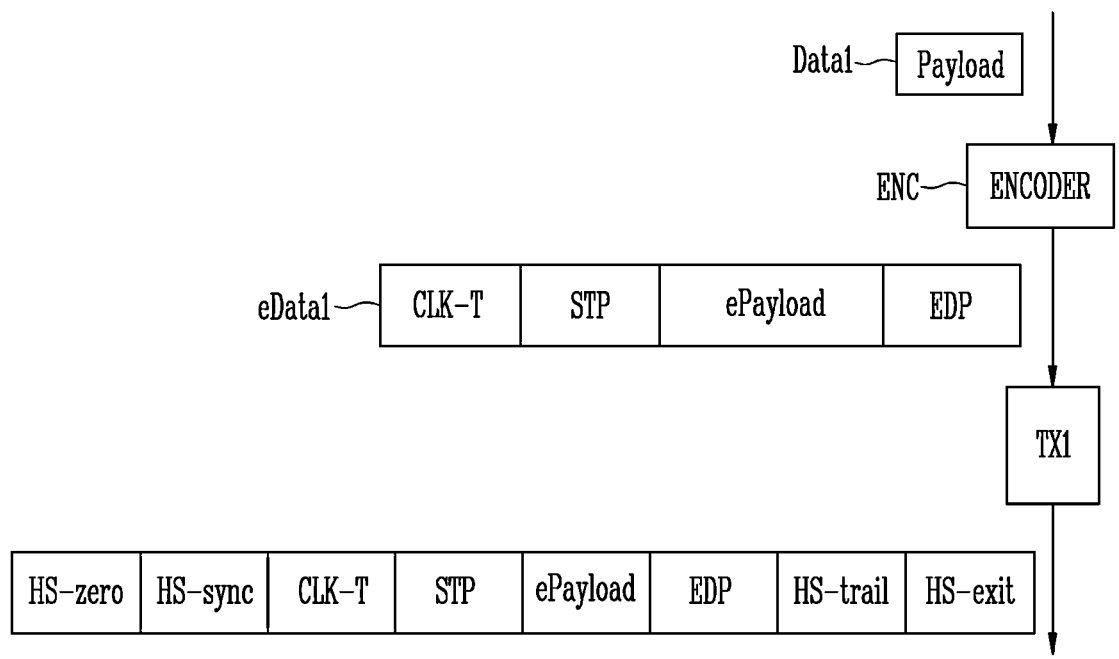
FIGS. 7 and 8 are diagrams illustrating an operation of a transmitter according to an alternative embodiment of the disclosure.
Figure 8:
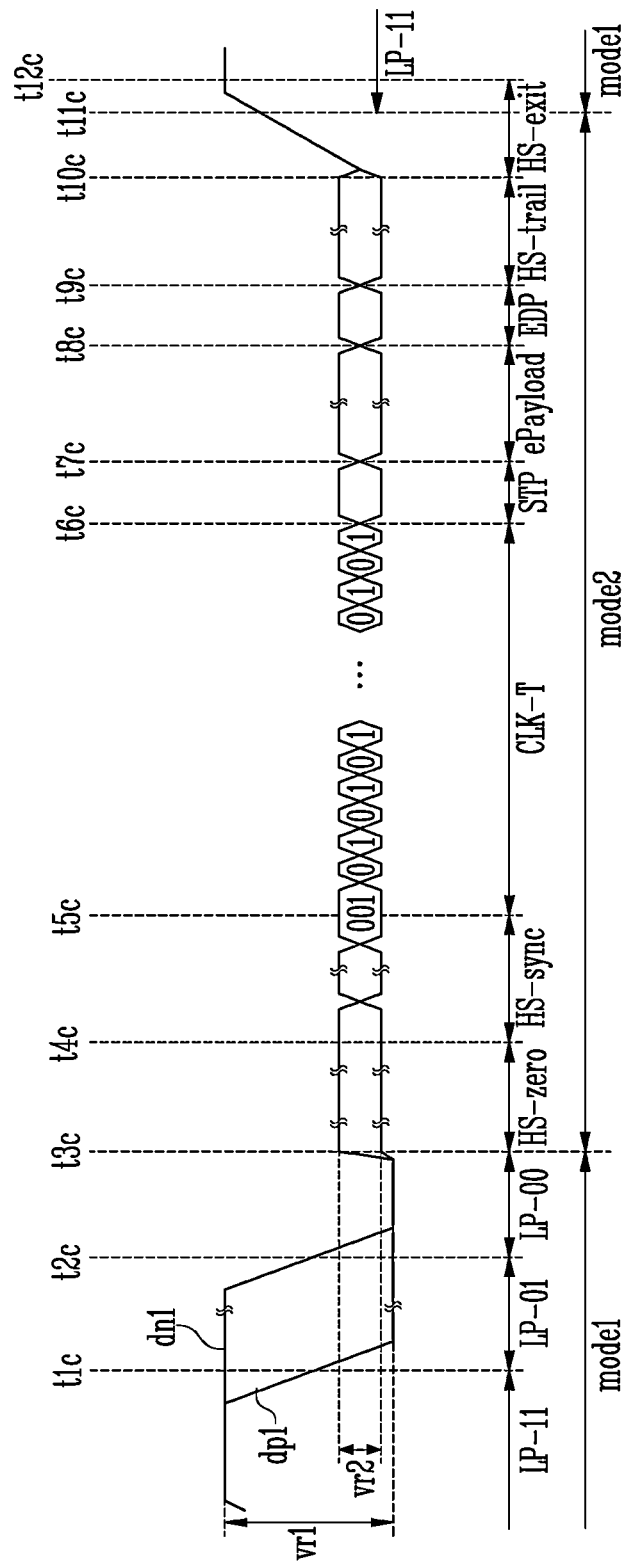

FIGS. 7 and 8 are diagrams illustrating an operation of a transmitter according to an alternative embodiment of the disclosure.

Referring to FIG. 7, in an embodiment, the encoder ENC may receive the first data Data1 including the third payload Payload. The encoder ENC may encode the third payload Payload to generate a first payload ePayload, and add data before and after (prior to and subsequent to) the first payload ePayload to generate the first encoded data eData1. In one embodiment, for example, the first encoded data eData1 may sequentially include a clock training pattern CLK-T, a start pattern STP, the first payload ePayload, and an end pattern EDP.

The clock training pattern CLK-T may include clock information. The receiver RXD may generate a clock signal having a specific frequency and a specific phase by using the clock information. In one embodiment, for example, the clock training pattern CLK-T may be a pattern in which one 1 and one 0 are repeated (for example, 01010101 . . . ). A frequency and a phase of the clock signal generated by the clock data recovery circuit of the receiver RXD may be undesirably changed by an external factor (noise, temperature, or the like). The receiver RXD may correct the frequency and the phase of the clock signal using the clock training pattern CLK-T. In one alternative embodiment, for example, the clock training pattern CLK-T may repeatedly include a plurality of successive 0s and a plurality of successive 1s (for example, 00001111000001111 . . . ). In an embodiment, frequency information and phase information indicated by the clock training pattern CLK-T may vary according to the number of plurality of successive 0s or the number of plurality of successive 1s.

The start pattern STP may be a pattern informing a transmission start of the first payload ePayload. The start pattern STP may be a pattern that the first payload ePayload which is in an encoded state may not include (=use inhibited). In one embodiment, for example, the start pattern STP may be configured as 24b'011100_000000_111111_110001'.

The first payload ePayload may include the clock information. In one embodiment, for example, when there are many successive 0s or many successive 1s in the third payload Payload, since transition of a signal may be small, a phase correction of the clock signal may not be sufficiently performed in the first data reception unit RX1, and a skew of the clock signal may occur. Therefore, the encoder ENC may performing encoding so that the number of transitions (a change from 0 to 1 or a change from 1 to 0) of the first payload ePayload is sufficiently great compared to the third payload Payload. In an embodiment, the encoder ENC may performing encoding so that the first payload ePayload periodically has a bit of a specific rule.

The end pattern EDP may be a pattern informing a transmission end of the first payload ePayload. In one embodiment, for example, the end pattern EDP may be configured as 24b'011100_111111_000000_110001'. The end pattern EDP may be a pattern that the first payload ePayload which is in the encoded state may not include (=use inhibited).

The first data transmission unit TX1 may receive the first encoded data eData1 including the first payload ePayload. The first data transmission unit TX1 may transmit other data by adding the other data before and after (prior to and subsequent to) the first encoded data eData1 according to a predetermined protocol. In one embodiment, for example, where the predetermined protocol is the MIPI protocol, the first data transmission unit TX1 may sequentially transmit the pattern HS-zero, the pattern HS-sync, the first encoded data eData1, the pattern HS-trail, and the pattern HS-exit.

Referring to FIG. 8, the transmitter TXD (in particular, the first data transmission unit TX1) may transmit the signals having the first voltage range vr1 to the first line dp1 and the second line dn1 in the first mode mode1. In an embodiment, the transmitter TXD may transmit the signals having the second voltage range vr2 less than the first voltage range vr1 to the first line dp1 and the second line dn1 in the second mode mode2.

In one embodiment, for example, the upper limit of the first voltage range vr1 may be greater than the upper limit of the second voltage range vr2, and the lower limit of the first voltage range vr1 may be less than the lower limit of the second voltage range vr2. In an embodiment, where the MIPI protocol is applied to the transceiver TSCV, the first mode mode1 may be the LP mode, and the second mode mode2 may be the HS mode.

In an embodiment, in the first mode mode1, the first line dp1 and the second line dn1 may be used in the single-ended method or operate based on a single-ended signaling. That is, the signals transmitted to each of the first line dp1 and the second line dn1 in the first mode mode1 may be the same as or different from each other. In an embodiment, in the second mode mode2, the first line dp1 and the second line dn1 may be used in the differential method or operate based on a differential signaling. That is, the signals transmitted to each of the first line dp1 and the second line dn1 in the second mode mode2 are different from each other. The first line dp1 may be the positive line, and the second line dn1 may be the negative line.

When transmitting the first payload ePayload to the receiver RXD, the transmitter TXD may be sequentially driven in the first mode mode1, the second mode mode2, and the first mode mode1, and the transmitter TXD may transmit the clock training pattern CLK-T and the first payload ePayload in the second mode mode2.

In an embodiment, the transmitter TXD may transmit the predefined patterns (for example, the pattern LP-11, the pattern LP-01, and the pattern LP-00) to the first line dp1 and the second line dn1 to inform switching from the first mode mode1 to the second mode mode2.

In one embodiment, for example, the transmitter TXD may maintain the signals applied to the first line dp1 and the second line dn1 as the logic high level before a time point t1c (LP-11 pattern). When the voltage level of the signal is greater than the first predefined threshold voltage level, the voltage level of the signal may be determined as the logic high level, and when the voltage level of the signal is less than the predefined second threshold voltage level, the voltage level of the signal may be determined as the logic low level. Next, at the time point t1c, the transmitter TXD may change the signal of the first line dp1 to the logic low level and maintain the signal of the second line dn1 as the logic high level (that is, the pattern LP-01). Next, at a time point t2c, the transmitter TXD may maintain the signal of the first line dp1 as the logic low level and change the signal of the second line dn1 to the logic low level (that is, the pattern LP-00).

Next, in the second mode mode2, the transmitter TXD may sequentially transmit the pattern HS-zero, the pattern HS-sync, the first encoded data eData1, the pattern HS-trail, and the pattern HS-exit described above. In one embodiment, for example, the transmitter TXD may transmit the pattern HS-zero during a period from a time point t3c to a time point t4c, transmit the pattern HS-sync during a period t4c to t5c, transmit the clock training pattern CLK-T during a period t5c to t6c, transmit the start pattern STP during a period from a time point t6c to a time point t7c, transmit the first payload ePayload during a period from a time point tc7 to a time point tc8, transmit the end pattern EDP during a period from a time point t8c to a time point t9c, transmit the pattern HS-trail during a period from a time point t9c to a time point t10c, and transmit the pattern HS-exit after the time point t10c.

The pattern HS-zero may be a pattern for informing a waiting period after entering from the first mode mode1 to the second mode mode2. In one embodiment, for example, the pattern HS-zero may be a pattern in which 0 is repeated.

The pattern HS-sync may be a pattern informing a transmission start of the first encoded data eData1. In one embodiment, for example, the pattern HS-sync may have OxB8h value or 00011101 value.

The pattern HS-trail may be a pattern informing a transmission end of the first encoded data eData1. The pattern HS-trail may be a pattern in which a value opposite to last data of the first encoded data eData1 is repeated. In one embodiment, for example, when the last data (bit) of first encoded data eData1 is 0, the pattern HS-trail may be a pattern in which 1 is repeated. In one embodiment, for example, when the last data (bit) of the first encoded data eData1 is 1, the pattern HS-trail may be a pattern in which 0 is repeated.

The pattern HS-exit may be a pattern informing that the second mode mode2 is ended and the first mode mode1 is started. The pattern HS-exit may not be configured of a specific bit, but may be a transitional pattern in which a voltage is increased to exceed the second voltage range vr2.

The transmitter TXD may change the signals applied to the first line dp1 and the second line dn1 to the logic high level during a period from a time point t11c to a time point t12c (that is, the pattern LP-11). Accordingly, the transmitter TXD may inform that the second mode mode2 is ended and the first mode mode1 is started.

In an embodiment, the receiver RXD may generate the clock signal using the clock training pattern CLK-T and the first payload ePayload. The first data reception unit RX1 may include a clock data recovery circuit and may generate a clock signal having specific frequency and phase using the clock training pattern CLK-T. In an embodiment, the first data reception unit RX1 may continuously correct the phase of the clock signal to prevent skew of the clock signal using the first payload ePayload. The first data reception unit RX1 may sample the received data using the generated clock signal. Therefore, in such an embodiment, the transceiver TSCV capable of communicating using the MIPI protocol without a clock line may be provided.

Figure 9:
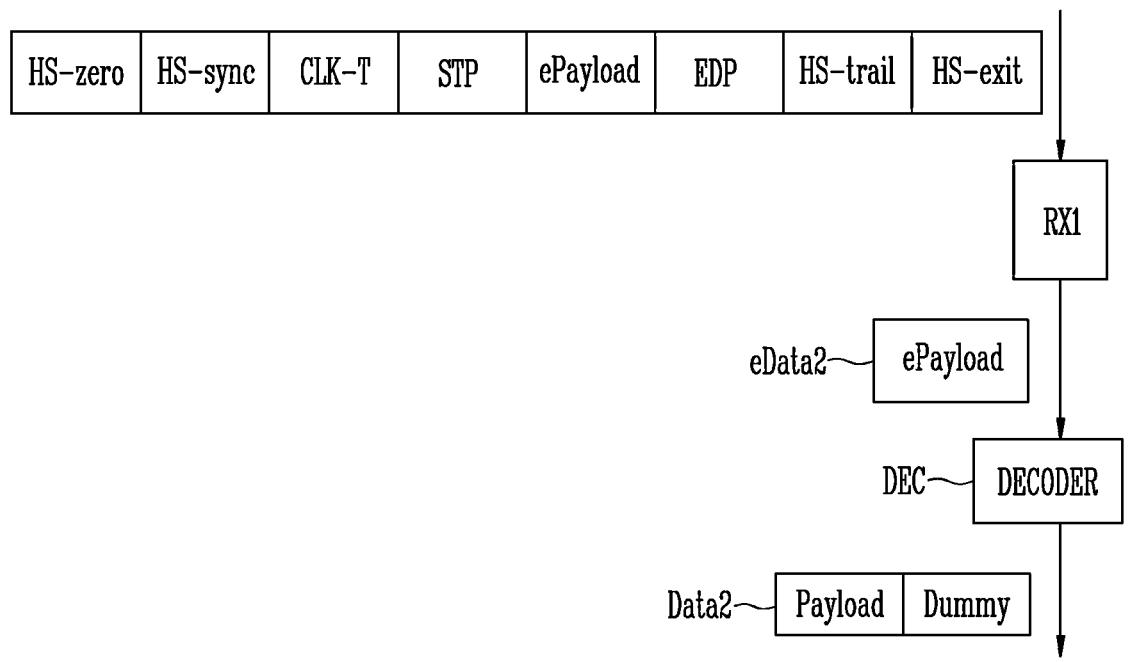
FIG. 9 is a diagram illustrating a receiver according to an alternative embodiment of the disclosure.

FIG. 9 is a diagram illustrating a receiver according to an alternative embodiment of the disclosure.

In an embodiment, the first data reception unit RX1 may provide the second encoded data eData2 including the first payload ePayload among the received data to the decoder DEC.

The decoder DEC may decode the second encoded data eData2 (that is, the first payload ePayload) to generate the second data Data2, and provide the generated second data Data2 to the reception controller RXC. The second data Data2 may include a second payload Payload and a dummy pattern Dummy. The second payload Payload is the same as the third payload of the first data Data1 provided by the transmission controller TXC.

The dummy pattern Dummy may be encoded in advance to be embedded in the first payload ePayload by the encoder ENC, or may be added by the decoder DEC. The dummy pattern Dummy may be data in which a same value is repeated. In one embodiment, for example, when the last value of the second payload Payload is 0, the dummy pattern Dummy is data in which 1 is repeated, and when the last value of the second payload Payload is 1, the dummy pattern Dummy may be data in which 0 is repeated. Therefore, in such an embodiment, since a format (the payload and the dummy pattern Dummy) of the second data Data2 received by the reception controller RXC of FIG. 6A may be the same as a format (the payload and the additional information C) of the second data Data2 received by the reception controller RXCr of FIG. 2, an MIPI protocol interface may not be used to change the format even though the clock line is removed from the transceiver TSCV.

Similar to a case of the second data Data2, a format of the plurality of control signals RxActiveHS, RxValidHS, RxSyncHS, and RxByteClkHS generated by the receiver RXD (in particular, the first data reception unit RX1) may be the same as a format of the plurality of control signals RxActiveHS, RxValidHS, RxSyncHS, and RxByteClkHS generated by the receiver RXDr (in particular, the first data reception unit RX1r). Therefore, in such an embodiment, the MIPI protocol interface may not be used to change the format even though the clock line is removed from the transceiver TSCV.

In such an embodiment, since waveforms of the second data Data2 and the plurality of control signals RxActiveHS, RxValidHS, RxSyncHS, and RxByteClkHS may be the same as those of FIG. 5, the second data Data2 and the plurality of control signals RxActiveHS, RxValidHS, RxSyncHS, and RxByteClkHS will hereinafter be described in detail with referring back to FIG. 5.

An embodiment of the second data Data2 and the plurality of control signals RxActiveHS, RxValidHS, RxSyncHS, and RxByteClkHS generated by the receiver RXD (in particular, the first data reception unit RX1) are shown in FIG. 5.

The control signal RxByteClkHS may be a clock signal for informing a data transmission unit of a byte unit. In one embodiment, for example, the control signal RxByteClkHS may indicate that one byte of the second data Data2 is transmitted for each one cycle of the control signal RxByteClkHS. In an embodiment, the control signal RxByteClkHS may be a clock signal used for data processing in the reception controller RXC. In one embodiment, for example, the control signal RxByteClkHS may be the entire system clock for data processing after a deserializer.

The second data Data2 may include the additional information C and the second payload Payload configured of byte units B1, B2, B3, B4, B5, . . . , and Bn. Here, the additional information C may be information corresponding to the dummy pattern Dummy other than the pattern HS-trail. In one embodiment, for example, the additional information C may be 8 bit information in which 0 is repeated or 1 is repeated. In one embodiment, for example, the first data reception unit RX1 may transmit the second data Data2 obtained by parallelizing the decoded second payload Payload and the dummy pattern Dummy through the deserializer (for example, parallelizing to 8 lines) to the reception controller RXC.

At a time point t1b, a logic level of the first control signal RxActiveHS may be changed from a first level (for example, the logic low level) to a second level (for example, the logic high level). The time point t1b may correspond to one cycle before the control signal RxByteClkHS from a time point t2b at which transmission of the second data Data2 is started. The first data reception unit RX1 may determine the time point t1b, based on the time point t7c at which the start pattern STP is ended.

At a time point t2b, a logic level of the second control signal RxValidHS may be changed from the first level to the second level. The time point t2b may be a time point at which first data B1 of the second payload Payload of the second data Data2 is output. The time point t2b may be one cycle after the control signal RxByteClkHS from the time point t1b.

At the time point t1b, a logic level of the third control signal RxSyncHS may be changed from the first level to the second level, and at the time point t2b, the logic level may be changed from the second level to the first level.

Figure 10:
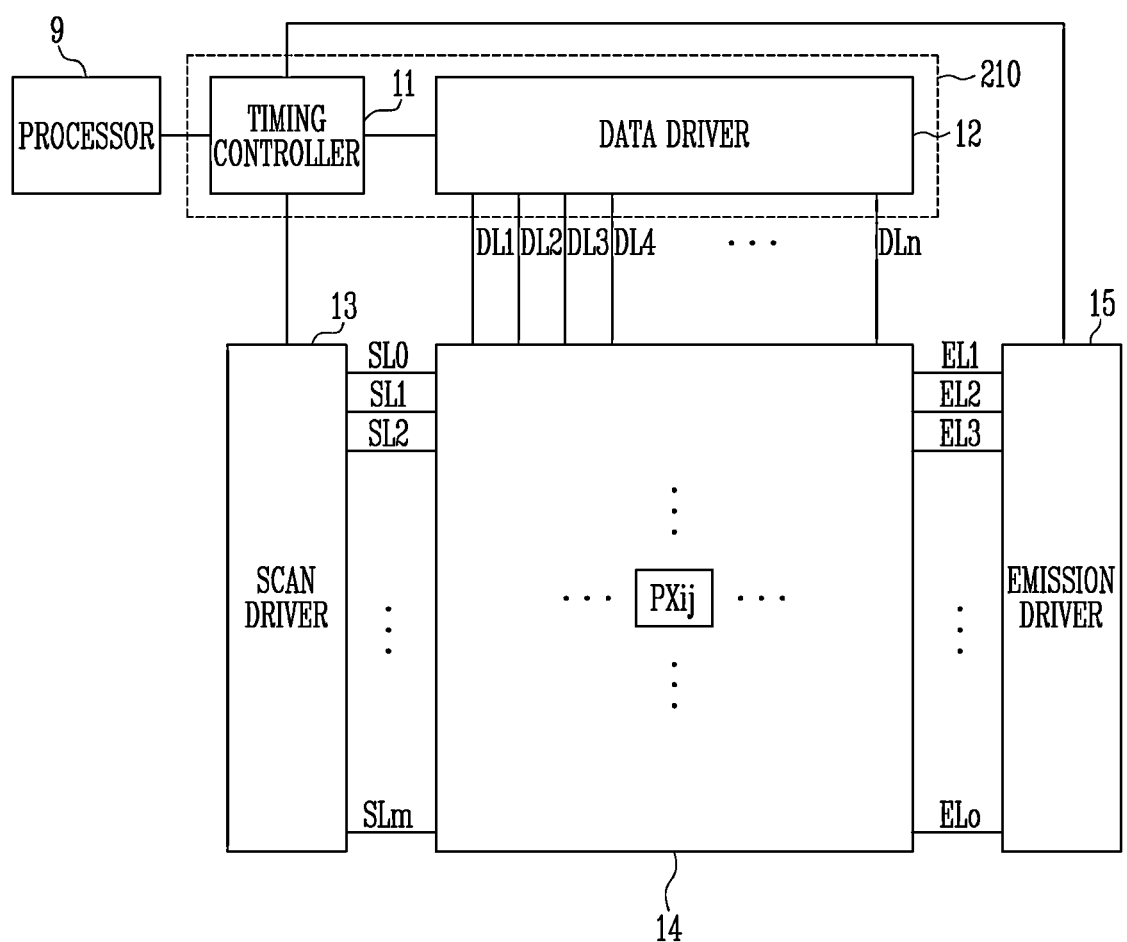
FIG. 10 is a diagram illustrating a display device according to an embodiment of the disclosure.

FIG. 10 is a diagram illustrating a display device according to an embodiment of the disclosure.

Referring to FIG. 10, an embodiment of the display device may include a timing controller 11, a data driver 12, a scan driver 13, a pixel unit 14, and an emission driver 15. In an embodiment, each functional unit may be integrated into a single IC, integrated into a plurality of ICs, or mounted on a display substrate. In an embodiment, the timing controller 11 and the data driver 12 may be integrated into a single IC and may be configured as a single display driver 210. In such an embodiment, the display driver 210 may be referred to as the above-described TED. In an embodiment, the display driver 210 may further include at least one selected from the scan driver 13 and the emission driver 15.

A processor 9 may correspond to at least one selected from a GPU, a CPU, an AP, and the like. The processor 9 may correspond to the above-described transmitter TXD. In an embodiment, the timing controller 11, the data driver 12, or the display driver 210 may correspond to the above-described receiver RXD (refer to FIG. 6A).

The timing controller 11 may receive grayscales and timing signals for each display frame period from the processor 9. The timing signals may include a vertical synchronization signal, a horizontal synchronization signal, a data enable signal, and the like.

Each cycle of the vertical synchronization signal may correspond to each display frame period. Each cycle of the horizontal synchronization signal may correspond to each horizontal period. The grayscales may be supplied in a horizontal line unit in each horizontal period in response to a pulse of the data enable signal. The horizontal line may mean pixels (for example, a pixel row) connected to a same scan line and emission line.

The timing controller 11 may render the grayscales to correspond to the specification of the display device. In one embodiment, for example, the processor 9 may provide a red grayscale, a green grayscale, and a blue grayscale for each unit dot. In one embodiment, for example, where the pixel unit 14 has an RGB stripe structure, the pixels may correspond to each grayscale one-to-one. In such an embodiment, rendering of the grayscales may be omitted. In one alternative embodiment, for example, where the pixel unit 14 has a PENTILE® structure, since the pixel is shared by adjacent unit dots, the pixels may not correspond to each grayscale one-to-one. In such an embodiment, rendering of the grayscales may be performed. The rendered or non-rendered grayscales may be provided to the data driver 12. In an embodiment, the timing controller 11 may provide a data control signal to the data driver 12. In embodiment, the timing controller 11 may provide a scan control signal to the scan driver 13 and may provide an emission control signal to the emission driver 15.

The data driver 12 may generate data voltages (that is, data signals DLn) to be provided to data lines DL1, DL2, DL3, DL4, . . . , and DLn using the grayscales and the data control signal received from the timing controller 11. Here, n may be an integer greater than 0.

The scan driver 13 may generate scan signals to be provided to scan lines SL0, SL1, SL2, . . . , and SLm using the scan control signal (for example, a clock signal, a scan start signal, and the like) received from the timing controller 11. The scan driver 13 may sequentially supply scan signals having a pulse of a turn-on level to the scan lines SL0 to SLm. The scan driver 13 may include scan stages configured in a form of a shift register. The scan driver 13 may generate the scan signals by sequentially transferring the scan start signal that is a pulse form of a turn-on level from one scan stage to a next scan stage based on a control of the clock signal. Here, m may be an integer greater than 0.

The emission driver 15 may generate emission signals to be provided to emission lines EL1, EL2, EL3, . . . , and ELo using the emission control signal (for example, a clock signal, an emission stop signal, and the like) received from the timing controller 11. The emission driver 15 may sequentially supply emission signals having a pulse of a turn-off level to the emission lines EL1 to ELo. The emission driver 15 may include emission stages configured in a form of a shift register. The emission driver 15 may generate the emission signals by sequentially transferring the emission stop signal that is a pulse form of a turn-off level from one emission stage to a next emission stage based on a control of the clock signal. Here, o may be an integer greater than 0.

The pixel unit 14 includes the pixels. Each pixel PXij may be connected to corresponding data line, scan line, and emission line. The pixels may include pixels that emit light of a first color, pixels that emit light of a second color, and pixels that emit light of a third color. The first color, the second color, and the third color may be different colors from each other. In one embodiment, for example, the first color may be one of red, green, and blue, the second color may be one other than the first color among red, green, and blue, and the third color may be one other than the first color and the second color among red, green, and blue. Alternatively, magenta, cyan, and yellow may be used instead of red, green, and blue as the first to third colors.

Figure 11:
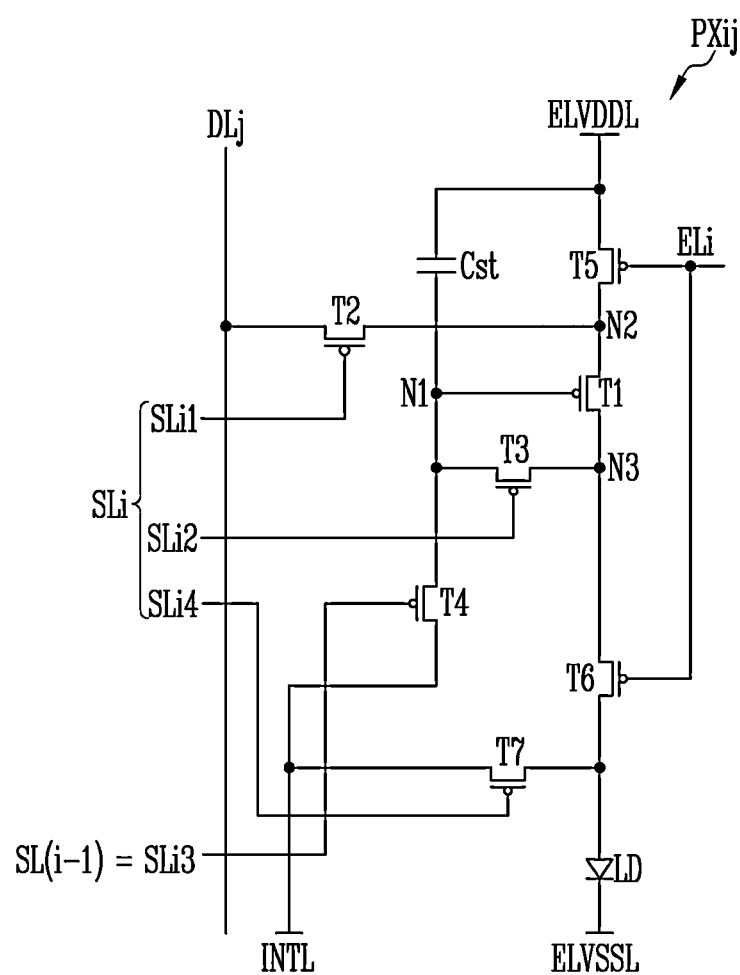
FIG. 11 is a diagram illustrating a pixel according to an embodiment of the disclosure.

FIG. 11 is a diagram illustrating a pixel according to an embodiment of the disclosure.

Referring to FIG. 11, an embodiment of the pixel PXij includes transistors T1, T2, T3, T4, T5, T6, and T7, a storage capacitor Cst, and a light emitting element LD.

Hereinafter, an embodiment where the pixel PXij includes a circuit configured of a P-type transistor will be described. However, those skilled in the art will be able to modify the pixel PXij to include a circuit configured of an N-type transistor by differentiating a polarity of a voltage applied to a gate terminal. Similarly, those skilled in the art will be able to modify the pixel PXij to include a circuit configured of a combination of a P-type transistor and an N-type transistor. The P-type transistor is collectively referred to as a transistor in which a current amount increases when a voltage difference between a gate electrode and a source electrode increases in a negative direction. The N-type transistor is collectively referred to as a transistors in which a current amount increases when a voltage difference between a gate electrode and a source electrode increases in a positive direction. The transistor may be configured in various forms such as a thin film transistor ("TFT"), a field effect transistor ("FET"), and a bipolar junction transistor ("BJT").

The first transistor T1 may include a gate electrode connected to a first node N1, a first electrode connected to a second node N2, and a second electrode connected to a third node N3. The first transistor T1 may be referred to as a driving transistor.

The second transistor T2 may include a gate electrode connected to a scan line SLi1, a first electrode connected to a data line DLj, and a second electrode connected to the second node N2. The second transistor T2 may be referred to as a scan transistor.

The third transistor T3 may include a gate electrode connected to a scan line SLi2, a first electrode connected to the first node N1, and a second electrode connected to the third node N3. The third transistor T3 may be referred to as a diode connection transistor.

The fourth transistor T4 may include a gate electrode connected to a scan line SLi3, a first electrode connected to the first node N1, and a second electrode connected to an initialization line INTL. The fourth transistor T4 may be referred to as a gate initialization transistor.

The fifth transistor T5 may include a gate electrode connected to an i-th emission line Eli, a first electrode connected to a first power line ELVDDL, and a second electrode connected to the second node N2. The fifth transistor T5 may be referred to as an emission transistor. In an alternative embodiment, the gate electrode of the fifth transistor T5 may be connected to an emission line different from an emission line connected to a gate electrode of the sixth transistor T6.

The sixth transistor T6 may include the gate electrode connected to the i-th emission line ELi, a first electrode connected to the third node N3, and a second electrode connected to an anode of the light emitting element LD. The sixth transistor T6 may be referred to as an emission transistor. In an alternative embodiment, the gate electrode of the sixth transistor T6 may be connected to an emission line different from the emission line connected to the gate electrode of the fifth transistor T5.

The seventh transistor T7 may include a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power line ELVDDL and a second electrode may be connected to the first node N1.

The anode of the light emitting element LD may be connected to the second electrode of the sixth transistor T6 and a cathode may be connected to a second power line ELVSSL. The light emitting element LD may be a light emitting diode. The light emitting element LD may be configured of an organic light emitting element (organic light diode), an inorganic light emitting element (inorganic light emitting diode), a quantum dot/well light emitting element (quantum dot/well light emitting diode), or the like. The light emitting element LD may emit light in any one of the first color, the second color, and the third color. In an embodiment, a single light emitting element LD may be provided in each pixel, but not being limited thereto. Alternatively, a plurality of light emitting elements may be provided in each pixel. In such an embodiment, the plurality of light emitting elements may be connected to each other in series, parallel, series-parallel, or the like.

The first power line ELVDDL may be supplied with a first power voltage, the second power line ELVSSL may be supplied with a second power voltage, and the initialization line INTL may be supplied with an initialization voltage. In one embodiment, for example, the first power voltage may be greater than the second power voltage. In one embodiment, for example, the initialization voltage may be equal to or greater than the second power voltage. In one embodiment, for example, the initialization voltage may correspond to a data voltage of the smallest size among data voltages that may be provided. In one alternative embodiment, for example, the size of the initialization voltage may be less than sizes of the data voltages that may be provided.

Figure 12:
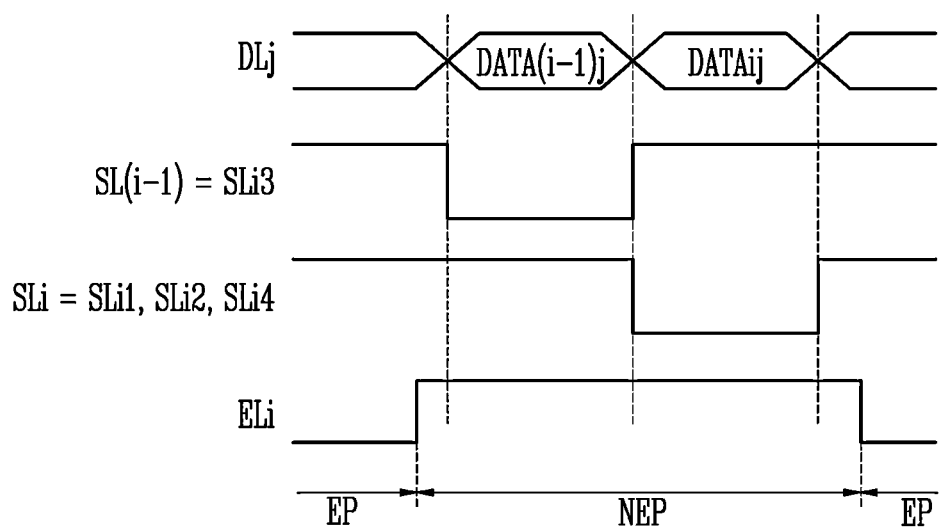
FIG. 12 is a diagram illustrating a method of driving the pixel of FIG. 11.

FIG. 12 is a diagram illustrating a method of driving the pixel of FIG. 11.

Hereinafter, for convenience of description, an embodiment where the scan lines SLi1, SLi2, and SLi4 are i-th scan lines SLi and the scan line SLi3 is an (i−1)-th scan line SL(i−1) will be described in detail. However, a connection relationship of the scan lines SLi1, SLi2, SLi3, and SLi4 may be variously modified. In one embodiment, for example, the scan line SLi4 may be the (i−1)-th scan line or an (i+1)-th scan line.

First, an emission signal of a turn-off level (logic high level) is applied to the i-th emission line ELi, a data voltage DATA(i−1)j for an (i−1)-th pixel is applied to the data line DLj, and a scan signal of a turn-on level (logic low level) is applied to the scan line SLi3. The high/low of the logic level may be determined according to whether a transistor is a P-type or an N-type.

At this time, since a scan signal of a turn-off level is applied to the scan lines SLi1 and SLi2, the second transistor T2 is turned off and the data voltage DATA(i−1)j is prevented from being input to the pixel PXij.

At this time, since the fourth transistor T4 is turned on, the first node N1 is connected to the initialization line INTL, and a voltage of the first node N1 is initialized. Since the emission signal of the turn-off level is applied to the emission line Ei, the transistors T5 and T6 are turned off, and light emission of an undesired light emitting element LD according to an initialization voltage application process is effectively prevented.

Next, a data voltage DATAij for the i-th pixel PXij is applied to the data line DLj, and the scan signal of the turn-on level is applied to the i-scan lines SLi1 and SLi2. Accordingly, the transistors T2, T1, and T3 are turned on, and the data line DLj and the first node N1 are electrically connected with each other. Therefore, a compensation voltage obtained by subtracting a threshold voltage of the first transistor T1 from the data voltage DATAij is applied to the second electrode of the storage capacitor Cst (that is, the first node N1), and the storage capacitor Cst maintains a voltage corresponding to a difference between the first power voltage and the compensation voltage. Such a period may be referred to as a threshold voltage compensation period or a data writing period.

In an embodiment, where the scan line SLi4 is the i-th scan line, since the seventh transistor T7 is turned on, the anode of the light emitting element LD and the initialization line INTL are connected with each other, and the light emitting element LD is initialized to a charge amount corresponding to a voltage difference between the initialization voltage and the second power voltage.

Thereafter, as the emission signal of the turn-on level is applied to the i-th emission line ELi, the fifth and sixth transistors T5 and T6 may be turned on. Therefore, a driving current path connecting the first power line ELVDDL, the fifth transistor T5, the first transistor T1, the sixth transistor T6, the light emitting element LD, and the second power line ELVSSL.

A driving current amount flowing to the first electrode and the second electrode of the first transistor T1 is adjusted based on the voltage maintained in the storage capacitor Cst. The light emitting element LD emits light with a luminance corresponding to the driving current amount. The light emitting element LD emits light until the emission signal of the turn-off level is applied to the emission line Ei.

In an embodiment, when the emission signal is the turn-on level, pixels receiving the corresponding emission signal may be in a display state. Therefore, a period in which the emission signal is the turn-on level may be referred to as an emission period EP (or an emission allowable period). In such an embodiment, when the emission signal is the turn-off level, pixels receiving the corresponding emission signal may be in a non-display state. Therefore, a period in which the emission signal is the turn-off level may be referred to as a non-emission period NEP (or an emission disallowable period).

The non-emission period NEP described with reference to FIG. 12 is provided for preventing the pixel PXij from emitting light with an undesired luminance during the initialization period and the data writing period.

One or more non-emission periods NEP may be additionally provided while data written in the pixel PXij is maintained (for example, one frame period). This may be for effectively expressing a low grayscale by reducing the emission period EP of the pixel PXij, or for smoothly blurring a motion of an image.

In an embodiment, the above-described transceiver TSCV may be applied to the display device, the pixel, and the method of driving the display device of FIGS. 10 and 11, but the disclosure is not limited to such an embodiment (refer to FIG. 6A). In alternative one embodiment, for example, the transceiver TSCV may be used for communication between the processor 9 and a camera device included in the display device, or may be used for communication between the processor 9 and a touch sensor (and other sensors).

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A transceiver comprising:
 a transmitter and a receiver connected to each other through a first line and a second line, wherein the transmitter transmits signals having a first voltage range to the first line and the second line in a first mode, and transmits signals having a second voltage range less than the first voltage range to the first line and the second line in a second mode, when transmitting a first payload to the receiver, the transmitter is sequentially driven in the first mode, the second mode, and the first mode, and the transmitter transmits a clock training pattern and the first payload in the second mode.

2. The transceiver according to claim 1, wherein
the first line and the second line are used in a single-ended method in the first mode, and
the first line and the second line are used in a differential method in the second mode.

3. The transceiver according to claim 1, wherein
the clock training pattern is a pattern in which one 0 and one 1 are repeated alternately with each other, and
the receiver generates a clock signal using the clock training pattern and the first payload.

4. The transceiver according to claim 3, wherein
the receiver decodes the first payload to generate a second payload and a dummy pattern, and
the dummy pattern is data in which a same value is repeated.

5. The transceiver according to claim 4, wherein
when a last value of the second payload is 0, the dummy pattern is data in which 1 is repeated, and
when the last value of the second payload is 1, the dummy pattern is data in which 0 is repeated.

6. The transceiver according to claim 4, wherein
the transmitter further transmits a start pattern between the clock training pattern and the first payload, and
the transmitter further transmits an end pattern after the first payload, in the second mode.

7. The transceiver according to claim 6, wherein
the receiver changes a logic level of a first control signal from a first level to a second level at a first time point based on an end of reception of the start pattern,
the receiver changes a logic level of a second control signal from the first level to the second level at a second time point after the first time point, and
the receiver outputs first data of the second payload at the second time point.

8. The transceiver according to claim 7, wherein
the receiver changes a logic level of a third control signal from the first level to the second level at the first time point, and
the receiver changes the logic level of the third control signal from the second level to the first level at the second time point.

9. The transceiver according to claim 4, wherein
the transmitter encodes a third payload to generate data in which the clock training pattern, a start pattern, the first payload, and an end pattern are sequentially positioned, and
the third payload is same data as the second payload.

10. The transceiver according to claim 9, wherein
the transmitter transmits data according to a mobile industry processor interface protocol,
the transmitter sequentially transmits an HS-zero pattern and an HS-sync pattern before transmitting the clock training pattern, and
the transmitter sequentially transmits an HS-trail pattern and an HS-exit pattern after transmitting the end pattern.

11. A method of driving a transceiver including a transmitter and a receiver connected to each other through a first line and a second line, the method comprising:
transmitting, by the transmitter, signals having a first voltage range to the first line and the second line in a first mode;
transmitting, by the transmitter, signals having a second voltage range less than the first voltage range to the first line and the second line in a second mode; and
transmitting, by the transmitter, the signals having the first voltage range to the first line and the second line in the first mode,
when transmitting a first payload to the receiver, the transmitter transmits a clock training pattern and the first payload in the second mode.

12. The method according to claim 11, wherein
the first line and the second line are used in a single-ended method in the first mode, and
the first line and the second line are used in a differential method in the second mode.

13. The method according to claim 11, wherein
the clock training pattern is a pattern in which one 0 and one 1 are repeated alternately with each other, and
the receiver generates a clock signal using the clock training pattern and the first payload.

14. The method according to claim 13, wherein
the receiver decodes the first payload to generate a second payload and a dummy pattern, and
the dummy pattern is data in which a same value is repeated.

15. The method according to claim 14, wherein
when a last value of the second payload is 0, the dummy pattern is data in which 1 is repeated, and
when the last value of the second payload is 1, the dummy pattern is data in which 0 is repeated.

16. The method according to claim 14, wherein
the transmitter further transmits a start pattern between the clock training pattern and the first payload, and
the transmitter further transmits an end pattern after the first payload, in the second mode.

17. The method according to claim 16, wherein
the receiver changes a logic level of a first control signal from a first level to a second level at a first time point based on an end of reception of the start pattern,
the receiver changes a logic level of a second control signal from the first level to the second level at a second time point after the first time point, and
the receiver outputs first data of the second payload at the second time point.

18. The method according to claim 17, wherein
the receiver changes a logic level of a third control signal from the first level to the second level at the first time point, and
the receiver changes the logic level of the third control signal from the second level to the first level at the second time point.

19. The method according to claim 14, wherein
the transmitter encodes a third payload to generate data in which the clock training pattern, a start pattern, the first payload, and an end pattern are sequentially positioned, and
the third payload is same data as the second payload.

20. The method according to claim 19, wherein
the transmitter transmits data according to a mobile industry processor interface protocol, the transmitter sequentially transmits an HS-zero pattern and an HS-sync pattern before transmitting the clock training pattern, and the transmitter sequentially transmits an HS-trail pattern and an HS-exit pattern after transmitting the end pattern.

* * * * *